US011883773B2

(12) United States Patent
Galan

(10) Patent No.: US 11,883,773 B2
(45) Date of Patent: Jan. 30, 2024

(54) ODOR FILTERING LID ASSEMBLY

(71) Applicant: Oscar Galan, Milwaukee, WI (US)

(72) Inventor: Oscar Galan, Milwaukee, WI (US)

(*) Notice: Subject to any disclaimer, the term of this patent is extended or adjusted under 35 U.S.C. 154(b) by 159 days.

(21) Appl. No.: 17/676,294

(22) Filed: Feb. 21, 2022

(65) Prior Publication Data
US 2023/0264136 A1 Aug. 24, 2023

(51) Int. Cl.
A47J 36/38 (2006.01)
B01D 53/04 (2006.01)
A47J 36/06 (2006.01)
A47J 45/07 (2006.01)

(52) U.S. Cl.
CPC .......... *B01D 53/0407* (2013.01); *A47J 36/06* (2013.01); *A47J 36/38* (2013.01); *A47J 45/071* (2013.01); *B01D 2253/102* (2013.01); *B01D 2257/90* (2013.01); *B01D 2259/45* (2013.01)

(58) Field of Classification Search
CPC .......... B01D 53/04; A47J 36/38; A47J 45/071
See application file for complete search history.

(56) References Cited

U.S. PATENT DOCUMENTS

| 3,141,568 | A | 7/1964 | Chuanico |
| 5,626,266 | A | 5/1997 | Michelson |
| 5,873,298 | A | 2/1999 | Chang |
| 7,387,204 | B2 | 6/2008 | Lee |
| 10,321,966 | B2 | 6/2019 | Sato |
| 2004/0187702 | A1 | 9/2004 | Xu |
| 2022/0175185 | A1* | 6/2022 | Thies ............... A47J 43/046 |

FOREIGN PATENT DOCUMENTS

GB 2338641 12/1999

* cited by examiner

*Primary Examiner* — Sharon Pregler

(57) ABSTRACT

An odor filtering lid assembly includes a lid that is positionable on a cooking pot and that has female threads which are integrated into a perimeter of the lid. A first disk has a plurality of first air holes each extending through the first disk to pass air through the first disk. The first disk has male threads integrated into the first disk which threadably engaging the female threads in the lid for removably attaching the first disk to the lid. An air filter is positioned against the first disk to filter odors from air passing through the air filter. A second disk has a plurality of second air holes each extending through the second disk to pass air through the second disk. The second disk is positionable against the first disk such that the air filter is positioned between the first disk and the second disk.

9 Claims, 4 Drawing Sheets

ODOR FILTERING LID ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to odor filtering devices and more particularly pertains to a new odor filtering device for removing cooking odors from a cooking pot. The device includes a lid, a first disk that is attachable to the lid which is foraminous to pass air through the first disk. The device includes a second disk that is foraminous to a pass air through the second disk and which is attachable to the first disk. The device includes an air filter that is positioned between the first disk and the second disk, comprised of activated carbon, for removing odors from the air that passes through the first disk and the second disk.

(2) Description of Related Art Including Information Disclosed Under 37 CFR 1.97 and 1.98

The prior art relates to odor filtering devices including a cooking utensil cover with a mesh screen to facilitate a cooking utensil to be visible during cooking. The prior art discloses a filtering pot cover that includes a pair of plates, a filtering element positioned between the plates and a rotatable diverter to diverting air to either flow through the filtering element or around the filtering element. The prior art discloses a forced venting pot lid which includes at least one vent, a blower which blows air through the vent and a filtering element in the at least one vent for filtering odors from the at least one vent.

BRIEF SUMMARY OF THE INVENTION

An embodiment of the disclosure meets the needs presented above by generally comprising a lid that is positionable on a cooking pot and that has female threads which are integrated into a perimeter of the lid. A first disk has a plurality of first air holes each extending through the first disk to pass air through the first disk. The first disk has male threads integrated into the first disk which threadably engaging the female threads in the lid for removably attaching the first disk to the lid. An air filter is positioned against the first disk to filter odors from air passing through the air filter. A second disk has a plurality of second air holes each extending through the second disk to pass air through the second disk. The second disk is positionable against the first disk such that the air filter is positioned between the first disk and the second disk.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
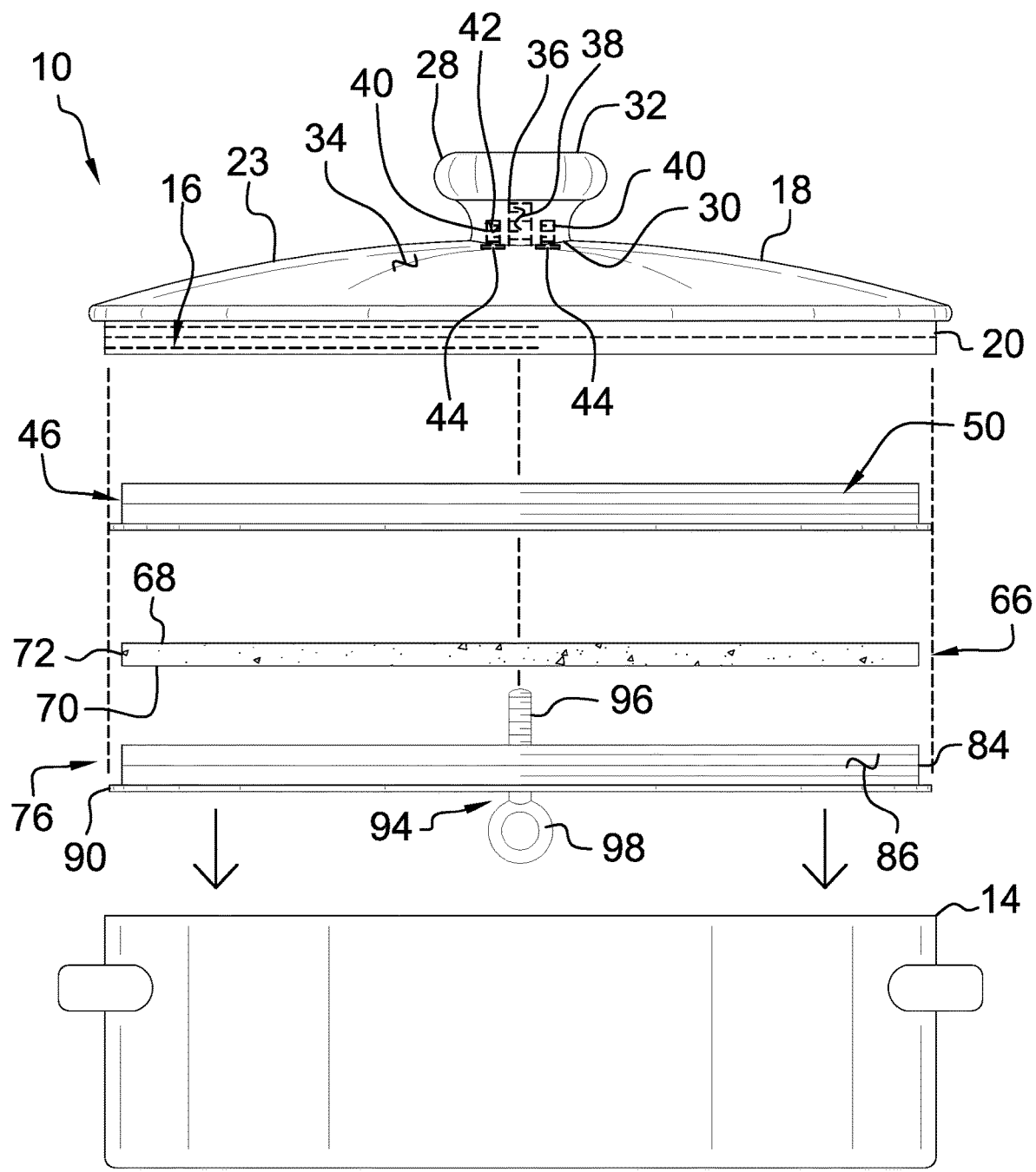
FIG. 1 is a front exploded view of an odor filtering lid assembly according to an embodiment of the disclosure.
Figure 2:
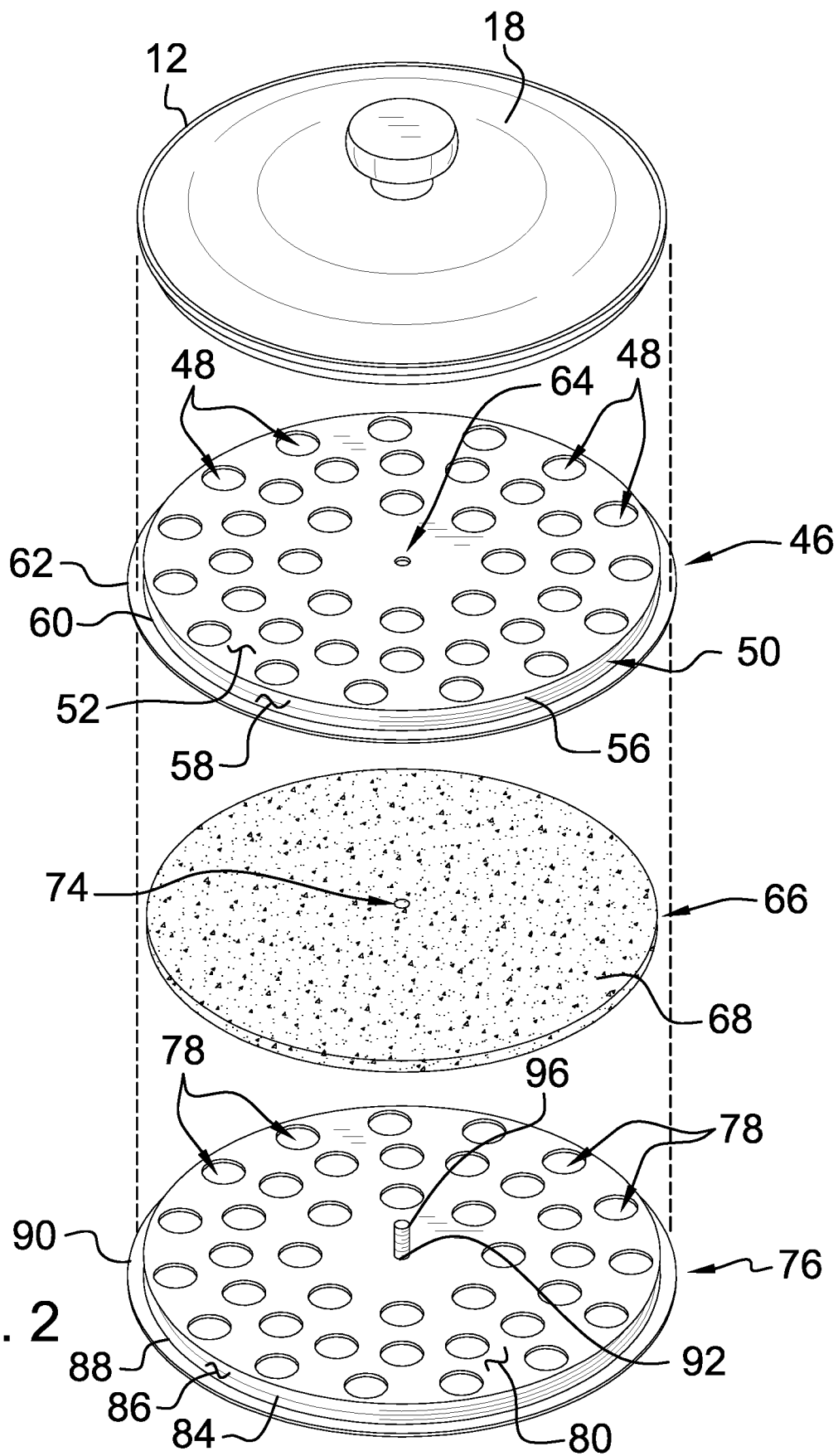
FIG. 2 is a top perspective exploded view of an embodiment of the disclosure.
Figure 3:
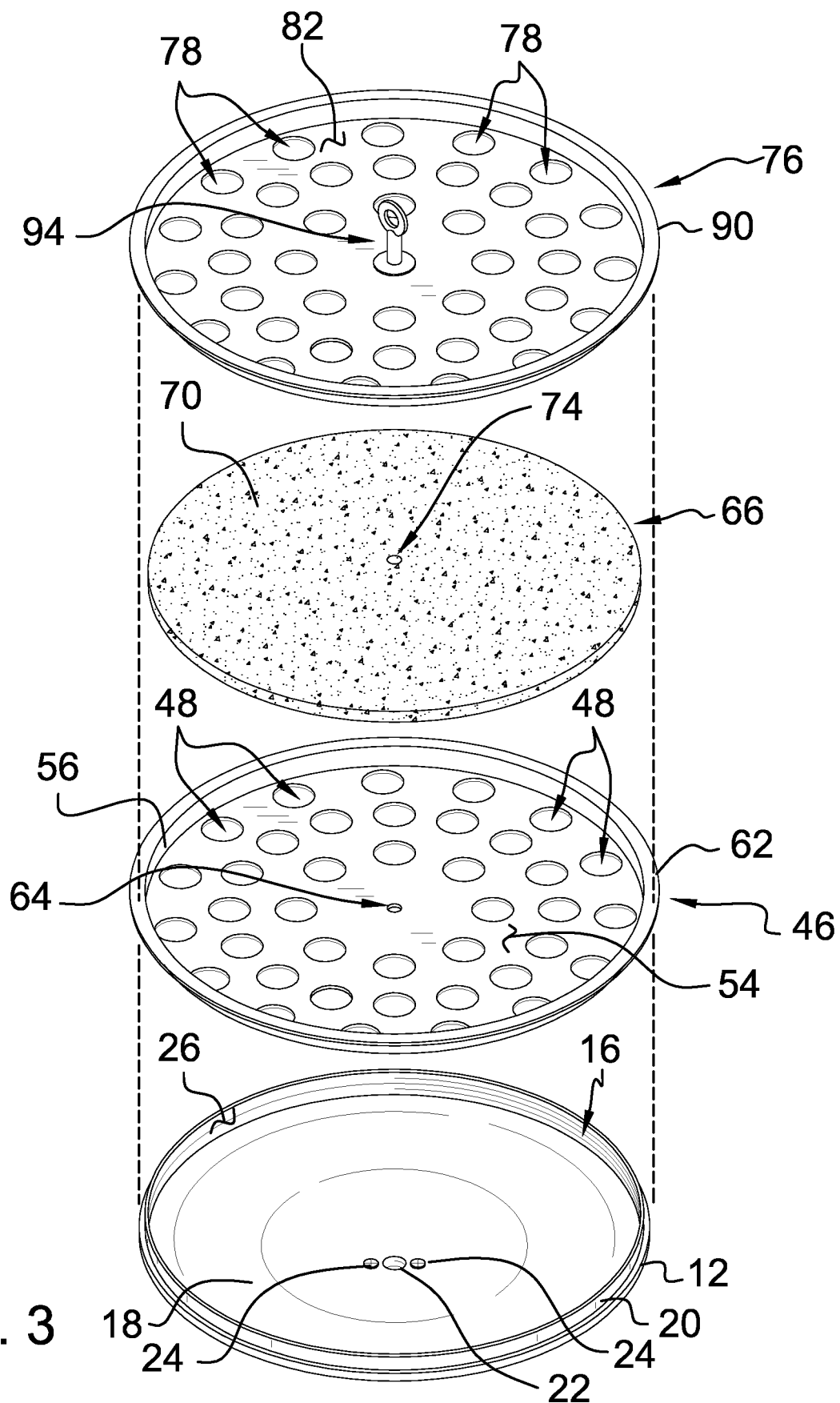
FIG. 3 is a bottom perspective exploded view of an embodiment of the disclosure.
Figure 4:
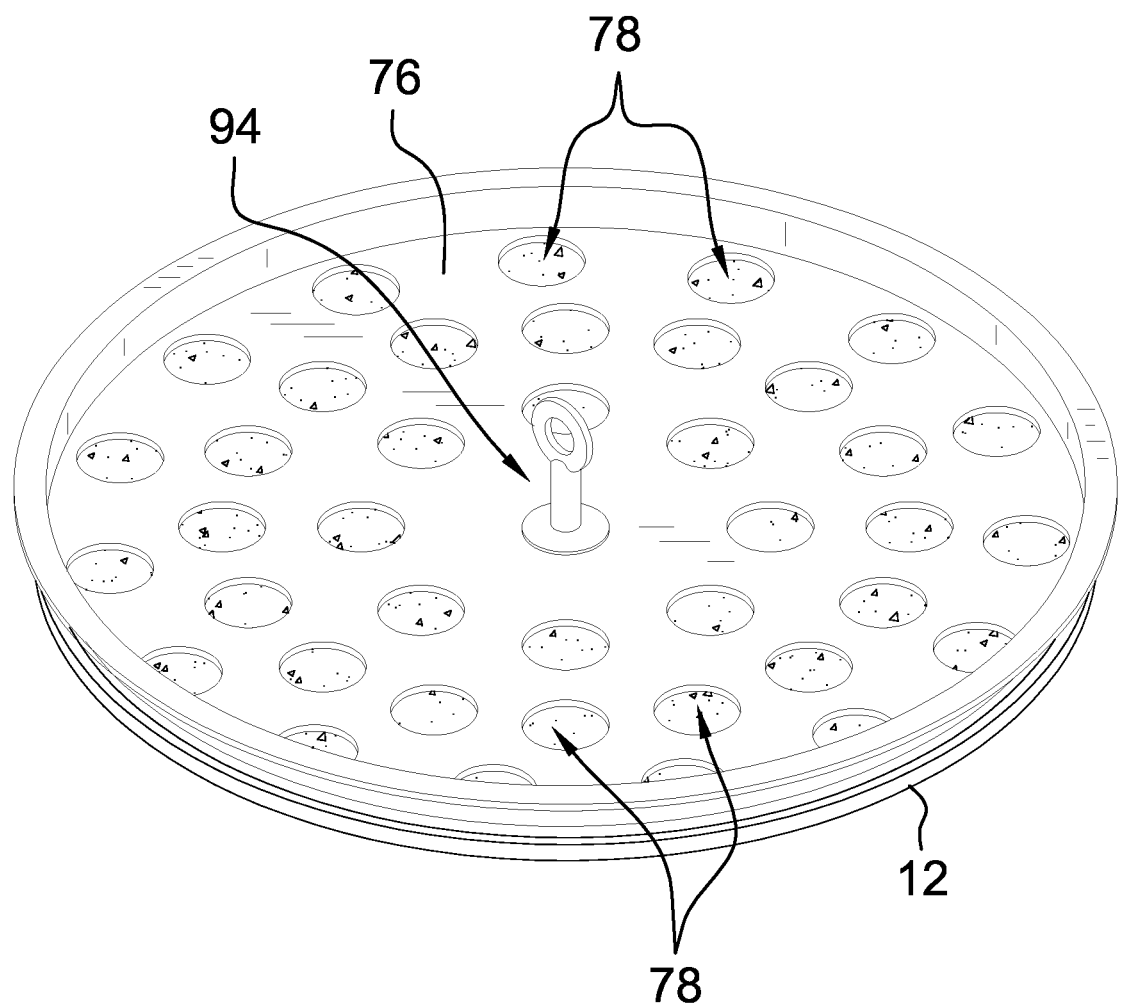
FIG. 4 is a bottom view of an embodiment of the disclosure.

With reference now to the drawings, and in particular to FIGS. 1 through 4 thereof, a new odor filtering device embodying the principles and concepts of an embodiment of the disclosure and generally designated by the reference numeral 10 will be described.

As best illustrated in FIGS. 1 through 4, the odor filtering lid assembly 10 generally comprises a lid 12 that is positionable on a cooking pot 14 and female threads 16 are integrated into a perimeter of the lid 12. The lid 12 has a top wall 18 and a perimeter wall 20 extending downwardly from the top wall 18, and the top wall 18 curves upwardly from the perimeter wall 20 such that the top wall 18 defines a dome. The top wall 18 has a primary hole 22 extending through the top wall 18 and the primary hole 22 is centrally positioned on the top wall 18. Additionally, the top wall 18 has a pair of secondary holes 24 each extending through the top wall 18 and each of the secondary holes 24 is positioned on opposite sides of the primary hole 22 from each other. The perimeter wall 20 has an inwardly facing surface 26 and the female threads 16 are integrated into the inwardly facing surface 26.

A handle 28 is removably attached to the lid 12 for gripping the lid 12. The handle 28 has a bottom end 30 and a top end 32, and the bottom end 30 rests on a top surface 34 of the top wall 18 of the lid 12. The bottom end 30 has a primary well 36 extending toward the top end 32, the primary well 36 has a bounding surface 38 that is threaded and the primary well 36 is centrally positioned on the bottom end 30. The bottom end 30 has a pair of secondary wells 40 each extending toward the top end 32 and each of the secondary wells 40 has a bounding surface 42 that is threaded. Each of the secondary wells 40 is positioned on opposite sides of the primary well 36 from each other. The primary well 36 is aligned with the primary hole 22 when the handle 28 is positioned on the lid 12 and each of the secondary wells 40 is aligned with a respective one of the secondary holes 24 when the handle 28 is positioned on the lid 12. A pair of screws 44 is provided and each of the screws 44 extends through a respective one of the secondary holes 24 in the top wall 18 of the lid 12 and threadably engages the bounding surface 42 of a respective one of the secondary wells 40 in the bottom end 30 of the handle 28 for releasably attaching the handle 28 to the lid 12.

A first disk 46 has is provided and a plurality of first air holes 48 each extends through the first disk 46 to pass air through the first disk 46. The first disk 46 has male threads 50 that are integrated into the first disk 46 and the male threads 50 threadably engage the female threads 50 in the lid 12 for removably attaching the first disk 46 to the lid 12. The first disk 46 has an upper surface 52, a lower surface 54 and perimeter wall 56 extending downwardly from the lower surface 54 and the perimeter wall 56 of the first disk 46 has an outwardly facing surface 58 and a distal edge 60 with respect to the lower surface 54. Each of the first air holes 48 extends through the upper surface 52 and the lower surface 54. Moreover, the first air holes 48 are spaced apart from each other and are arranged into a plurality of concentric rings each extending around a center of the first disk 46. The first disk 46 is comprised of a rigid and heat resistant material such as a metallic alloy or other similar material that is approved for cooking.

The male threads 50 are integrated into the outwardly facing surface 58 of the perimeter wall 56 of the first disk 46. The perimeter wall 56 of the first disk 46 has a first lip 62 extending laterally away from the outwardly facing surface 58 and the first lip 62 is aligned with the distal edge 60 of the perimeter wall 56 of the first disk 46. The first disk 46 has a hole 64 extending through the upper surface 52 and the lower surface 54 and the hole 64 in the first disk 46 is aligned with the center of the first disk 46. Furthermore, the hole 64 in the first disk 46 is aligned with the primary hole 22 in the lid 12 when the first disk 46 is attached to the lid 12.

An air filter 66 is positioned against the first disk 46 and the air filter 66 is comprised of activated coconut carbon to filter odors from air passing through the air filter 66. The air filter 66 has a top side 68, a bottom side 70 and a peripheral edge 72 extending between the top side 68 and the bottom side 70, and the peripheral edge 72 is continuously arcuate about a center of the air filter 66 such that the air filter 66 has a disk shape. The top side 68 abuts the lower surface 54 of the first disk 46 having the peripheral edge 72 abutting the perimeter wall 56 of the first disk 46. Additionally, the air filter 66 has a hole 74 extending through the top side 68 and the bottom side 70, and the hole 74 in the air filter 66 is aligned with the center of the air filter 66. The hole 74 in the air filter 66 is aligned with the hole 64 in the first disk 46 when the air filter 66 is positioned against the first disk 46.

A second disk 76 is provided which has a plurality of second air holes 78 each extending through the second disk 76 to pass air through the second disk 76. The second disk 76 is positionable against the first disk 46 such that the air filter 66 is positioned between the first disk 46 and the second disk 76. The second disk 76 has a top surface 80, a bottom surface 82 and perimeter wall 84 extending downwardly from the bottom surface 82, and the perimeter wall 84 of the second disk 76 has an outwardly facing surface 86 and a distal edge 88 with respect to the bottom surface 82. Each of the second air holes 78 extends through the top surface 80 and the bottom surface 82, and the second air holes 78 are spaced apart from each other and are arranged into a plurality of concentric rings each extending around a center of the second disk 76. The second disk 76 is comprised of a rigid and heat resistant material such as a metallic allow or other similar material that is approved for cooking.

The perimeter wall 84 of the second disk 76 has a second lip 90 extending laterally away from the outwardly facing surface 86 of the perimeter wall 84 of the second disk 76. The second lip 90 is aligned with the distal edge 88 of the perimeter wall 84 of the second disk 76 and the second disk 76 has a hole 92 extending through the top surface 80 and the bottom surface 82. The hole 92 in the second disk 76 is aligned with the center of the second disk 76 and the hole 92 in the second disk 76 is aligned with the hole 74 in the air filter 66 when the second disk 76 is attached to the lid 12.

An eyebolt 94 is provided which has a shaft 96 that is threaded and a ring 98 disposed on the shaft 96. The shaft 96 extends through the hole 92 in the second disk 76, the hole 74 in the air filter 66, the hole 64 in the first disk 46 and the primary hole 22 in the lid 12. Furthermore, the shaft 96 threadably engages the bounding surface 38 of the primary well 36 in the handle 28 for retaining each of the first disk 46, the air filter 66 and the second disk 76 to the lid 12 having the ring 98 abutting the bottom surface 82 of the second disk 76.

In use, the lid 12 is positioned on a cooking pot 14 when the cooking pot 14 is being employed for cooking a food item that commonly emits odors that may be unpleasant to certain individuals. Hot air rising in the cooking pot 14 passes through the second air holes 78 in the second disk 76, the air filter 66 and the first air holes 48 in the first disk 46 before the hot air can pass between the lid 12 and the cooking pot 14. In this way the air filter 66 removes odors from the hot air that are the result from the food item being cooked. Thus, the odors are inhibited from emanating into a kitchen or other location in which the food item is being cooked. The air filter 66 can be replaced when the odor absorbing qualities of the air filter 66 have diminished.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An odor filtering lid assembly for filtering odors emanating from a cooking pot while cooking food, said assembly comprising:

a lid being positionable on a cooking pot, said having female threads being integrated into a perimeter of said lid;

a handle being removably attached to said lid for gripping said lid;

a first disk having a plurality of first air holes each extending through said first disk wherein each of said first air holes is configured to pass air through said first disk, said first disk having male threads being integrated into said first disk, said male threads threadably engaging said female threads in said lid for removably attaching said first disk to said lid;

an air filter being positioned against said first disk, said air filter being comprised of activated coconut carbon wherein said air filter is configured to filter odors from air passing through said air filter; and a second disk having a plurality of second air holes each extending through said second disk wherein each of said second air holes is configured to pass air through said second disk, said second disk being positionable against said first disk such that said air filter is positioned between said first disk and said second disk;

wherein: said lid has a top wall and a perimeter wall extending downwardly from said top wall;

said top wall curving upwardly from said perimeter wall such that said top wall defines a dome;

said top wall has a primary hole extending through said top wall, said primary hole being centrally positioned on said top wall;

said top wall has a pair of secondary holes each extending through said top wall;

each of said secondary holes being positioned on opposite sides of said primary hole from each other; and said perimeter wall has an inwardly facing surface, said female threads being integrated into said inwardly facing surface.

2. The assembly according to claim 1, wherein:

said handle has a bottom end and a top end, said bottom end resting on a top surface of said top wall of said lid;

said handle has a primary well extending toward said top end, said primary well having a bounding surface being threaded, said primary well being centrally positioned on said bottom end;

said handle has a pair of secondary wells each extending toward said top end, each of said secondary wells having a bounding surface being threaded, each of said secondary wells being positioned on opposite sides of said primary well from each other; and said primary well is aligned with said primary hole when said handle is positioned on said lid, each of said secondary wells being aligned with a respective one of said secondary holes when said handle is positioned on said lid.

3. The assembly according to claim 1, wherein:

said first disk has an upper surface, a lower surface and perimeter wall extending downwardly from said lower surface, said perimeter wall of said first disk having an outwardly facing surface and a distal edge with respect to said lower surface, each of said first air holes extending through said upper surface and said lower surface, said first air holes being spaced apart from each other and being arranged into a plurality of concentric rings each extending around a center of said first disk, said male threads being integrated into said outwardly facing surface of said perimeter wall of said first disk;

said perimeter wall of said first disk has a first lip extending laterally away from said outwardly facing surface, said first lip being aligned with said distal edge of said perimeter wall of said first disk;

said first disk has a hole extending through said upper surface and said lower surface, said hole in said first disk being aligned with said center of said first disk, said hole in said first disk being aligned with said primary hole in said lid when said first disk is attached to said lid.

4. The assembly according to claim 2, further comprising a pair of screws, each of said screws extending through a respective one of said secondary holes in said top wall of said lid and threadably engaging said bounding surface of a respective one of said secondary wells in said bottom end of said handle for releasably attaching said handle to said lid.

5. The assembly according to claim 3, wherein said air filter has a top side, a bottom side and a peripheral edge extending between said top side and said bottom side, said peripheral edge being continuously arcuate about a center of said air filter such that said air filter has a disk shape, said top side abutting said lower surface of said first disk having said peripheral edge abutting said perimeter wall of said first disk.

6. The assembly according to claim 5, wherein said air filter has a hole extending through said top side and said bottom side, said hole in said air filter being aligned with said center of said air filter, said hole in said air filter being aligned with said hole in said first disk when said air filter is positioned against said first disk.

7. The assembly according to claim 6, wherein:

said second disk has a top surface, a bottom surface and perimeter wall extending downwardly from said bottom surface, said perimeter wall of said second disk having an outwardly facing surface and a distal edge with respect to said bottom surface, each of said second air holes extending through said top surface and said bottom surface, said second air holes being spaced apart from each other and being arranged into a plurality of concentric rings each extending around a center of said second disk;

said perimeter wall of said second disk having a second lip extending laterally away from said outwardly facing surface of said perimeter wall of said second disk, said second lip being aligned with said distal edge of said perimeter wall of said second disk;

said second disk has a hole extending through said top surface and said bottom surface, said hole in said second disk being aligned with said center of said second disk, said hole in said second disk being aligned with said hole in said air filter when said second disk is attached to said lid.

8. The assembly according to claim 6, wherein:

said handle has a primary well being integrated into said handle, said primary well having a bounding surface being threaded; and an eyebolt having a shaft being threaded and a ring disposed on said shaft, said shaft extending through said hole in said second disk and said hole in said air filter and said hole in said first disk and said primary hole in said lid, said shaft threadably engaging said bounding surface of said primary well in said handle for retaining each of said first disk and said air filter and said second disk to said lid having said ring abutting said bottom surface of said second disk.

9. An odor filtering lid assembly for filtering odors emanating from a cooking pot while cooking food, said assembly comprising:
- a lid being positionable on a cooking pot, said having female threads being integrated into a perimeter of said lid, said lid having a top wall and a perimeter wall extending downwardly from said top wall, said top wall curving upwardly from said perimeter wall such that said top wall defines a dome, said top wall having a primary hole extending through said top wall, said primary hole being centrally positioned on said top wall, said top wall having a pair of secondary holes each extending through said top wall, each of said secondary holes being positioned on opposite sides of said primary hole from each other, said perimeter wall having an inwardly facing surface, said female threads being integrated into said inwardly facing surface;
- a handle being removably attached to said lid for gripping said lid, said handle having a bottom end and a top end, said bottom end resting on a top surface of said top wall of said lid, said handle having a primary well extending toward said top end, said primary well having a bounding surface being threaded, said primary well being centrally positioned on said bottom end, said handle having a pair of secondary wells each extending toward said top end, each of said secondary wells having a bounding surface being threaded, each of said secondary wells being positioned on opposite sides of said primary well from each other, said primary well being aligned with said primary hole when said handle is positioned on said lid, each of said secondary wells being aligned with a respective one of said secondary holes when said handle is positioned on said lid;
- a pair of screws, each of said screws extending through a respective one of said secondary holes in said top wall of said lid and threadably engaging said bounding surface of a respective one of said secondary wells in said bottom end of said handle for releasably attaching said handle to said lid;
- a first disk having a plurality of first air holes each extending through said first disk wherein each of said first air holes is configured to pass air through said first disk, said first disk having male threads being integrated into said first disk, said male threads threadably engaging said female threads in said lid for removably attaching said first disk to said lid, said first disk having an upper surface, a lower surface and perimeter wall extending downwardly from said lower surface, said perimeter wall of said first disk having an outwardly facing surface and a distal edge with respect to said lower surface, each of said first air holes extending through said upper surface and said lower surface, said first air holes being spaced apart from each other and being arranged into a plurality of concentric rings each extending around a center of said first disk, said male threads being integrated into said outwardly facing surface of said perimeter wall of said first disk, said perimeter wall of said first disk having a first lip extending laterally away from said outwardly facing surface, said first lip being aligned with said distal edge of said perimeter wall of said first disk, said first disk having a hole extending through said upper surface and said lower surface, said hole in said first disk being aligned with said center of said first disk, said hole in said first disk being aligned with said primary hole in said lid when said first disk is attached to said lid;
- an air filter being positioned against said first disk, said air filter being comprised of activated coconut carbon wherein said air filter is configured to filter odors from air passing through said air filter, said air filter having a top side, a bottom side and a peripheral edge extending between said top side and said bottom side, said peripheral edge being continuously arcuate about a center of said air filter such that said air filter has a disk shape, said top side abutting said lower surface of said first disk having said peripheral edge abutting said perimeter wall of said first disk, said air filter having a hole extending through said top side and said bottom side, said hole in said air filter being aligned with said center of said air filter, said hole in said air filter being aligned with said hole in said first disk when said air filter is positioned against said first disk;
- a second disk having a plurality of second air holes each extending through said second disk wherein each of said second air holes is configured to pass air through said second disk, said second disk being positionable against said first disk such that said air filter is positioned between said first disk and said second disk, said second disk having a top surface, a bottom surface and perimeter wall extending downwardly from said bottom surface, said perimeter wall of said second disk having an outwardly facing surface and a distal edge with respect to said bottom surface, each of said second air holes extending through said top surface and said bottom surface, said second air holes being spaced apart from each other and being arranged into a plurality of concentric rings each extending around a center of said second disk, said perimeter wall of said second disk having a second lip extending laterally away from said outwardly facing surface of said perimeter wall of said second disk, said second lip being aligned with said distal edge of said perimeter wall of said second disk, said second disk having a hole extending through said top surface and said bottom surface, said hole in said second disk being aligned with said center of said second disk, said hole in said second disk being aligned with said hole in said air filter when said second disk is attached to said lid; and
- an eyebolt having a shaft being threaded and a ring disposed on said shaft, said shaft extending through said hole in said second disk and said hole in said air filter and said hole in said first disk and said primary hole in said lid, said shaft threadably engaging said bounding surface of said primary well in said handle for retaining each of said first disk and said air filter and said second disk to said lid having said ring abutting said bottom surface of said second disk.

* * * * *